Nov. 30, 1965  C. E. NORDQUEST  3,220,211
AUTOMOBILE AIR CONDITIONING SYSTEM
Filed July 29, 1964  7 Sheets-Sheet 1

INVENTOR.
Carl E. Nordquest
BY
J. C. Evans
HIS ATTORNEY

Nov. 30, 1965     C. E. NORDQUEST     3,220,211

AUTOMOBILE AIR CONDITIONING SYSTEM

Filed July 29, 1964     7 Sheets-Sheet 3

INVENTOR.
Carl E. Nordquest
BY
J. C. Evans
HIS ATTORNEY

Nov. 30, 1965  C. E. NORDQUEST  3,220,211
AUTOMOBILE AIR CONDITIONING SYSTEM
Filed July 29, 1964  7 Sheets-Sheet 5

INVENTOR.
Carl E. Nordquest
BY
J. C. Evans
HIS ATTORNEY

Nov. 30, 1965 C. E. NORDQUEST 3,220,211

AUTOMOBILE AIR CONDITIONING SYSTEM

Filed July 29, 1964 7 Sheets-Sheet 6

INVENTOR.
Carl E. Nordquest
BY
J.C. Evans
HIS ATTORNEY

Nov. 30, 1965     C. E. NORDQUEST     3,220,211

AUTOMOBILE AIR CONDITIONING SYSTEM

Filed July 29, 1964     7 Sheets-Sheet 7

INVENTOR.
Carl E. Nordquest
BY
J.C. Evans
HIS ATTORNEY

United States Patent Office 3,220,211
Patented Nov. 30, 1965

3,220,211
AUTOMOBILE AIR CONDITIONING SYSTEM
Carl E. Nordquest, Dayton, Ohio, assignor to General Motors Corporation, Detroit, Mich., a corporation of Delaware
Filed July 29, 1964, Ser. No. 385,993
19 Claims. (Cl. 62—217)

This invention relates to automobile air conditioning systems and more particularly to an integrated automobile air conditioning system having an improved compact fluid flow control package, compressor and variable speed changer mechanism arranged for quick installation and repair within the engine compartment of an automobile.

Many production type automotive air conditioning systems are characterized by the provision of large numbers of separate operative components located at widely spaced points under the hood of an automobile. It has been found that such an arrangement, in many instances, complicates installation and servicing.

It is an object of the present invention, therefore, to improve the installation and servicing procedures of automotive air conditioning systems by including the refrigerant flow control components of the system within a common housing that serves as means for structurally interconnecting an insulated evaporator housing to a low-profile compressor unit whereby the compressor, control components and evaporator assembly can be installed within the automobile engine as a unit and removed therefrom as a unit for servicing.

Another object of the invention is to reduce the cost of automobile air conditioning systems by the provision therein of a unitary fluid control assembly including an expansion valve, suction throttling valve and relief valve in a common housing including passageway means therein for operatively associating such valves with one another and with the condenser, evaporator and compressor units in the system wherein the components of the unitized control package are arranged to minimize manufacturing, original installation and servicing costs.

A still further object of the invention is to include a refrigerant receiver within the common housing of the fluid control unit for supportingly receiving a dehydrator means therein of economical disposable manufacture.

Yet another object of the present invent is to improve automobile air conditioning systems by the provision therein of an axial piston compressor of the swash plate drive type having a modified shell and tubular insert for forming outlet and inlet muffling chambers that are closed by an outer surface of the fluid control unit whereby the rear head of the compressor is eliminated; and wherein the shell and muffler insert serve as support means for a baffle and tuning tube structure where desirable.

Still another object of the present invention is to reduce the cost of manufacturing and servicing an axial piston swash plate driven type of refrigerant compressor by the provision of an arrangement that includes a removable end plate on the drive shaft end of a tubular, elongated open-ended compressor shell serving as a clutch-pulley support and a compression cylinder head having support grooves therein to receive seal means for fluidly separating the high and low pressure sides of the compressors one from the other.

A further object of the present invention is to improve the operating efficiency of an automobile air conditioning system by the provision of an improved speed changer assembly associated with a rotary compressor and a power take-off from an automobile engine for operating the compressor at a continuously varying speed between predetermined desired limits that on the low side exceeds the engine idle speed and on the high side is less than maximum engine r.p.m.

A further object of the present invention is to improve an automobile air conditioning system by means of such a speed changer that also includes improved means for continuously taking up belt slack and lateral belt placement throughout the control range of the speed changer.

Further objects and advantages of the present invention will be apparent from the following description, reference being had to the accompanying drawings wherein preferred embodiments of the present invention are clearly shown.

In the drawings:

FIGURE 1 is a diagrammatic view of the improved system shown associated with the passenger compartment and the engine of an automobile or the like;

The refrigerant system

Figure 1:
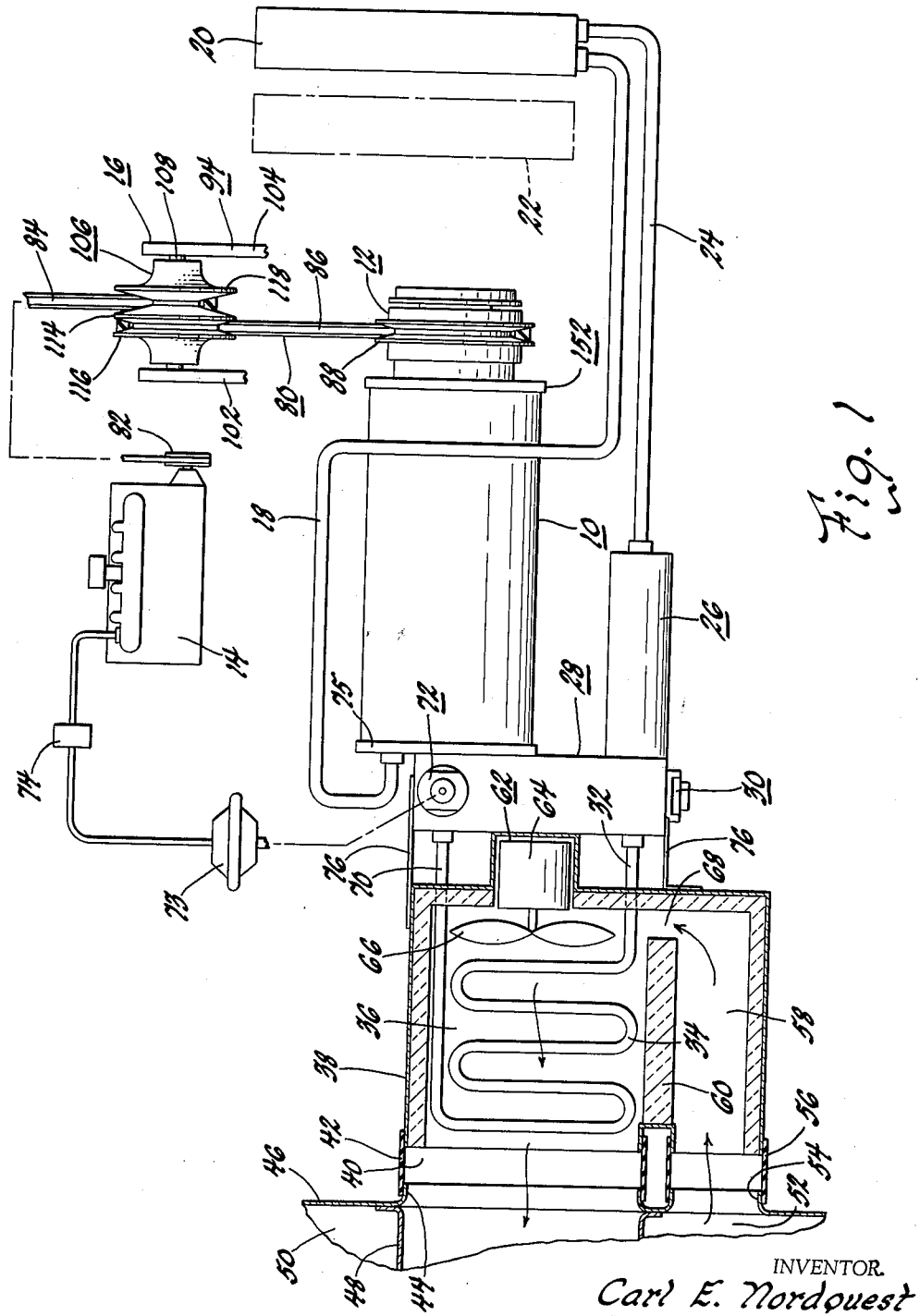

Referring now to the drawings, in FIGURE 1, the improved refrigeration system is somewhat diagrammatically illsutrated as including a compressor unit 10 having a magnetically operated pulley and clutch assembly 12 driven from a drive pulley on an automobile engine 14 through a speed changer assembly 16 whereby the compressor 10 is operated to discharge compressed refrigerant through a discharge line 18, which is fluidly communicated with a condenser 20 shown as being located forwardly of an automobile radiator 22 whereby air passes over the condenser 20 to remove heat from the high-pressure refrigerant gas therein for condensing it to a liquid state with the liquid then passing through a return line 24.

The return line 24 then passes into a receiver dehydrator 26 formed as an integral part of an improved integrated fluid control package 28 including an expansion valve unit 30 which automatically controls refrigerant flow through a connecting conduit 32 to an evaporator unit 34.

The evaporator 34 is representatively illustrated as being located within a chamber 36 formed by a housing 38 constructed of a suitable insulating material and having an open end 40 connected by means of a flexible boot 42 to a pierced opening 44 formed in the fire wall 46 of an automobile or the like which communicates through duct 48 forming part of a fluid distribution system for directing treated air into the passenger compartment 50 of the automobile.

In the illustrated arrangement, air is returned from the passenger compartment 50 through a suitable duct 52 and thence through a pierced opening 54 that is connected to a flexible boot 56 which, in turn, connects to the inlet opening of a return passageway 58 formed by the insulated housing 38. The return passage 58 is separated from the evaporator compartment 36 by a divider 60 so that return flow from the passenger compartment 50 can be drawn therefrom by means of a suitable air circulating device, for example, an axial air flow fan 62 including a motor drive 64 supported exteriorly of the housing 38 and a fan blade member 66 located within the evaporator compartment 36 whereby air is drawn from the passenger compartment 50 through the return passageway 58 across a divider 60 through an opening 68 therein to be discharged through the evaporator compartment 36 and into the passenger compartment 50. Air passing over the evaporator loses heat to the low pressure liquid therein which thereby evaporates to a gas which is returned through a line 70 into the improved integrated fluid control package 28 where a suction throttle valve unit 72 serves to automatically maintain the evaporator pressure at a desired predetermined point under suitable control such as a diaphragm actuator 73 connected to the engine manifold through a vacuum switch 74. The throttle control valve 72 then communicates with the compressor unit 10 to the suction side thereof for completing the refrigerant cycle by means including a flanged face 75 on the package 28 that is fastened to the compressor 10.

Typically, in present production automobile air conditioning systems, fluid flow will pass from the compressor through a line to a condenser and thence from the condenser through a line to a separate receiver dehydrator unit which is located remotely from the compressor unit. From the dehydrator unit the refrigerant passes through another line to an expansion valve assembly which is also located remotely from both the compressor and the receiver dehydrator. From the separate expansion valve the refrigerant passes through another line to the evaporator which is typically supported off the fire wall by rigid connecting means. From the evaporator the refrigerant returns by another line to a separate suction throttle control valve and thence through yet another conduit to the suction side of the compressor.

Typically, these units are located at varying points under the hood of an automobile necessitating, in addition to the large number of interconnecting lines, a like number of clamping means and vibration dampening means fgor holding them in place. A typical system of this type is illustrated in FIGURE 1 of United States Patent 2,892,319, issued June 30, 1959, to Jacobs. Further, as shown in FIGURE 1 of this patent, the air flow from the evaporator is controlled by a separately mounted fan having a scroll housing for drawing air from the passenger compartment and passing it across the evaporator. In view of the arrangements of the control valves, receiver, fan and evaporator in the refrigeration system and the necessity for substantial interconnecting lines between the control valves and the other parts of the system, it has been found that the overall refrigeration system is expensive to install originally and, moreover, is difficult to service.

In the inventive arrangement shown in FIGURE 1 of the present application, however, by virtue of the improved control package 28, separate lines from the receiver dehydrator to the expansion valve and the line from the throttling valve to the compressor are eliminated and, moreover, the evaporator and circulating fan are formed as an integral unit in combination with the valve control package by attachment straps 76 connected between the evaporator housing 38 and the package 28. By virtue of this arrangement, to mount the improved system under the hood of an automobile or the like, it is only necessary to locate the structurally connected compressor 10, fluid control package 28 and fan and evaporator containing housing 38 under the hood and then connect the housing 38 to the flanged opening in the fire wall 46 by means of boots 42 and 56. In servicing this unit, it is only necessary to disconnect the boots and lift out the interconnected compressor 10, control package 28 and housing 38 after loosening the belt between the speed changer 16 and clutch pulley assembly 12. The lines 18, 24 to the condenser are preferably flexible to enable the integrated members to be easily removed from the automobile without disconnecting the compressor 20 therefrom.

The unit is thereby rendered readily accessible for inspecting components of the fluid control valve 28 or the compressor 10 for servicing in the fiield.

On the other hand, if it is found that the refrigerant system has a component portion thereof that cannot be serviced in the field, a replacement unit can be connected to the condenser 20 and the system can be quickly recharged in the field and then relocated under the hood and connected to the distribution system of the passenger compartment 50 by connecting the boots 42, 56.

*The compressor drive*

Figure 4:
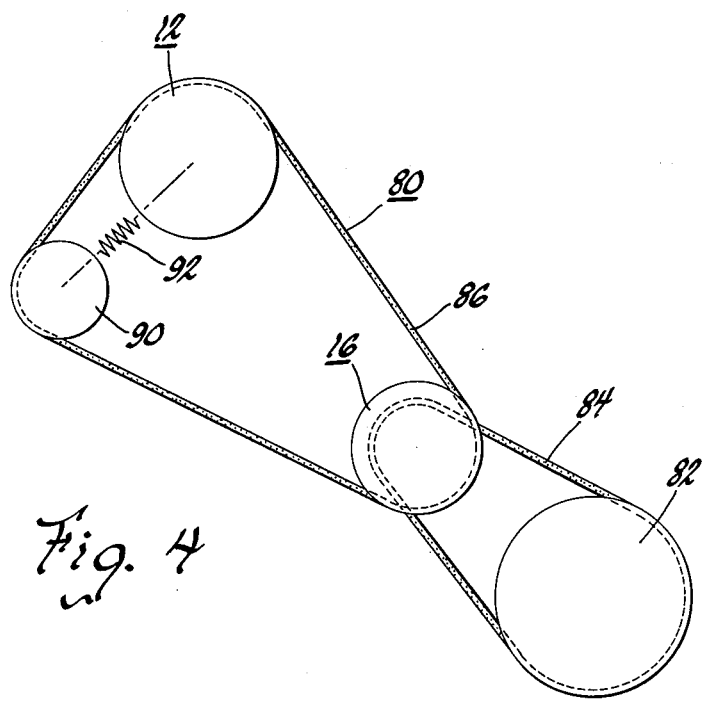
FIGURE 4 is a diagrammatic view showing a belt-pulley drive system for operating the compressor and an alternator through the improved speed changer.

In accordance with certain features of the present invention to improve the operating efficiency of the system illustrated in FIGURE 1, the compressor 10 is driven from the motor drive pulley through the improved speed changer 16 in a manner so that the compressor operating speed will at engine idle speeds be increased substantially to maintain a desired compressor output under all automobile operating conditions. In the past, it has been necessary to include a compressor in the system having a substantial excess capacity in order to assure that the passenger compartment would be maintained at a desired cool temperature during periods when the car engine was idling. As best illustrated in FIGURE 4, in the present invention the magnetic clutch and pulley assembly 12 of the compressor 10 is associated with an improved belt-pulley system 80 that is driven off the motor drive pulley 82 through a belt 84 that passes over the speed changer 16. Drive from the speed changer 16 passes through a belt 86 that is directed over the pulley of the magnetic clutch pulley assembly 12 and thence over a driven pulley 90 operatively connected to the alternator of the automobile system. In order to maintain a desired tension in the belt 86, a tension equalizing spring 92 is provided between the alternator and the compressor as diagrammatically shown in FIGURE 4.

Figure 2:
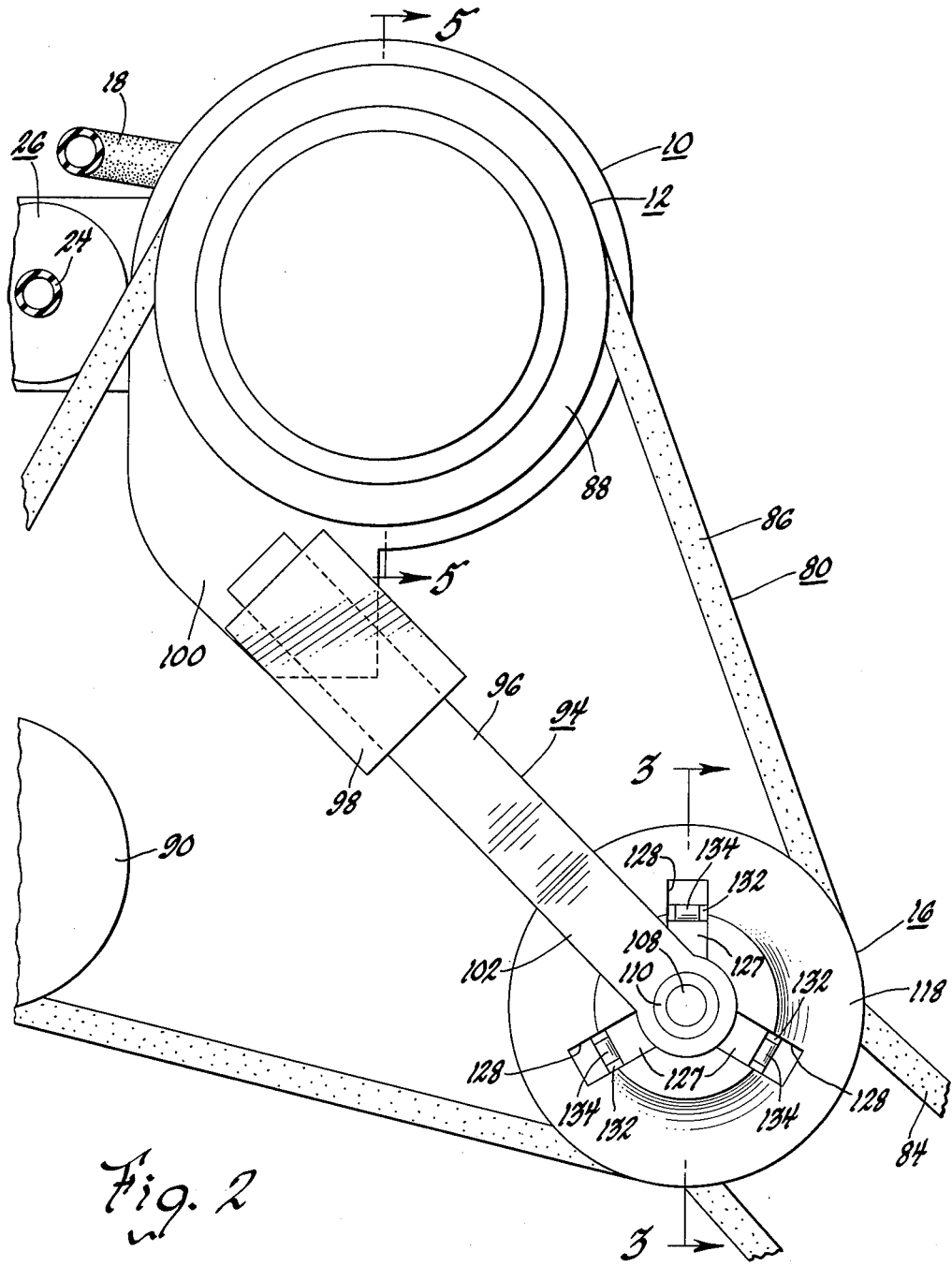
FIGURE 2 is an enlarged, fragmentary view in front elevation of the improved speed changer and pulley system of the present invention.
Figure 3:
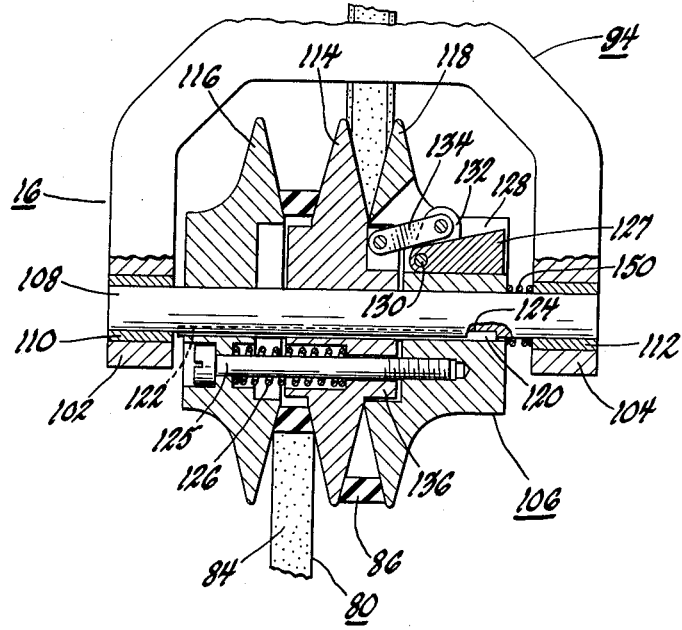
FIGURE 3 is a view in vertical section taken along the line 3–3 of FIGURE 2.

Referring now more specifically to the improved speed changer 16, in FIGURES 2 and 3 an arrangement is shown that includes a support arm 94 having an elongated end portion 96 directed through a sleeve 98 to be slidably supported therein for axial movement relative thereto. The sleeve 98 is representatively shown as being fixedly secured to a supporting bracket 100 on the compressor 10. The opposite end of the arm 94 is bifurcated to include a pair of bearing support arms 102, 104 located in spaced parallelism on either side of an adjustable pulley package 106. The package 106 is supported on a rotatable shaft 108 having the opposite ends thereof supportingly received within sleeve bearings 110, 112 that are supportingly received by the arms 102, 104, respectively.

The pulley package 106, more specifically, includes a first flanged member 114, and end flanged members 116, 118 located on either side thereof that are each slidably supported at a central hub portion thereof on the rotatable shaft 108 for axial movement therewith by means representatively illustrated as including an interlocking elongated key member 120 directed through an opening 122 in the shaft and opposed like openings 124 in each of the sheave members. A screw 125 is directed through members 114, 116 into threaded engagement with member 118 whereby the members 114, 116 are slidably guided on axial movement along shaft 108. A return spring 126 surrounds screw 125 between members 114, 116 to engage the hub portions of these members for biasing them apart.

The members 114, 116 cooperate to form a first variable width pulley that receives the belt 84 from the drive pulley 82. The other end member 118 cooperates with the intermediate flanged member 114 to form another pulley assembly that receives the belt 86 that passes over the driven pulley 88 of the compressor and the driven pulley 90 of the alternator.

In the illustrated arrangement a speed responsive pulley width changing means is included in the pulley package 106 representatively illustrated as including a plurality of circumferentially located weights 127 that are supported within recesses 128 formed in the hub of the flanged member 118. Each of the weights 127 is pivoted to the sheeve member 118 means of a pin 130 so that as the speed of the drive pulley belt 84 varies, the weight 127 will move radially inwardly and outwardly with respect to the axis of the rotatable shaft 108. Such movement of the weight 126 moves an offset ear portion 132 integrally formed on the inner end of the weight 126 in an axial direction whereby a link member 134 that has one end thereof pivotally connected to the ear 132 and the opposite end thereof pivotally connected to the central hub portion 136 of the intermediate flanged member 114 forces the intermediate member 114 away from the end flanged member 118 and toward the opposite end member 116. As the intermediate member 114 moves with respect to the end member 116. As the intermediate member 114 moves with respect to the end members 116, 118, the tension of the belts 84 and 86 is maintained by the tension equalizing spring 92 and sliding movement of the arm 96 with respect to the sleeve 98 so that the belts will always be in driving engagement with inclined inner faces on the flanged members.

In FIGURE 3, the speed changer is shown under idle conditions. Upon a speed increase the intermediate member 114 moves away from the end member 118, the belt 86 is held in driving engagement with the opposed inclined pulley faces whereby the effective diameter of the pulley formed by the flanged members 114, 118 is reduced. Concurrently, movement of the member 114 toward the member 116 will force the belt 84 radially outwardly from the center line of the rotatable shaft 108 and the effective diameter of the pulley formed by the members 114, 116 is increased. Hence, upon a speed increase, the speed ratio between the drive pulley 82 and the driven pulley 88 on the compressor 10 is reduced to produce a desired compressor output at the increased engine speed.

As the speed of the drive pulley 82 is reduced as, for example, under conditions where the engine is idling, the weights 127 will move radially inwardly and thereby draw the member 114 away from member 116 and toward end member 118. The effective diameter of the pulley formed by members 114, 116 is thereby reduced and that pulley formed by members 114 and 118 is increased as is illustrated in FIGURE 3. Under these conditions, the reduced drive speed from the pulley 82 is, by virtue of the improved speed changer assembly 16, increased to maintain an increased pulley speed at the compressor 10 so that the compressor output will be sufficient for passenger compartment cooling when the car is idling.

In addition to being comprised of a few parts of economic manufacture, the improved speed changer 16 is an extremely compact arrangement that can be mounted within the limited space in an engine compartment of present-day automobiles. Moreover, the provision of a floating support for the pulley package 106 as provided by the arm 96 slidably supported within the sleeve 98 compensates for changes in belt slack upon variations in the effective diameter in the pulley package. Moreover, variations in alignement of the drive pulley 82 with respect to the pulley made up by the members 114, 116 is compensated for by means of a coil spring 150 located between the arm 104 of the support arm and the hub of the outer flanged member 118. This spring 150 will shift the members 114, 116, 118 laterally along the rotatable shaft 108 to maintain a desired alignment between the drive pulley 82 and its associated pulley formed by the members 114, 116.

While the improved speed changer 16 is especially suitable for use in an automobile air conditioning system, it is also suitable for use in other drive systems requiring either speed reduction or speed increase between a drive and a driven pulley. Moreover, while the illustrated system serves to increase speed and then reduces speed from a drive pulley, by reversing the position of drive and driven pulleys in the system of FIGURE 4, the improved speed changer will act to reduce speed and then increase speed in the driven pulley.

*The compressor*

In accordance with certain other principles of the present invention the compressor driven by the improved drive system 80 is an improvement of the axial piston, swash plate driven compressor of the type disclosed in United States Patent No. 3,057,545, to Ransom et al., issued October 9, 1962.

In the present invention, the compressor 10 includes substantially all the internal operative parts of the Ransom et al. patent but, as best shown in FIGURES 5 and 9–11, has a modified end plate 152 at the drive end thereof, a modified outer casing 154 and an improved end closure arrangement at the end thereof opposite to the magnetic clutch and drive pulley assembly 12.

Figure 9:
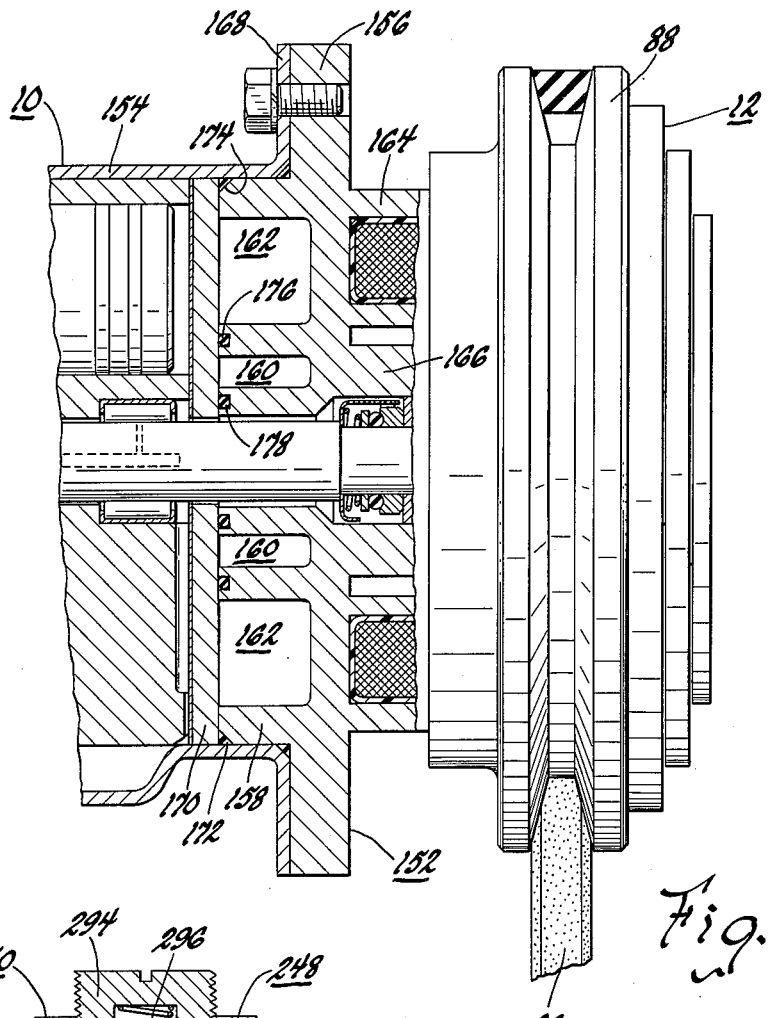
FIGURE 9 is a fragmentary view in vertical section of the driven end of the compressor of the invention.
Figure 8:
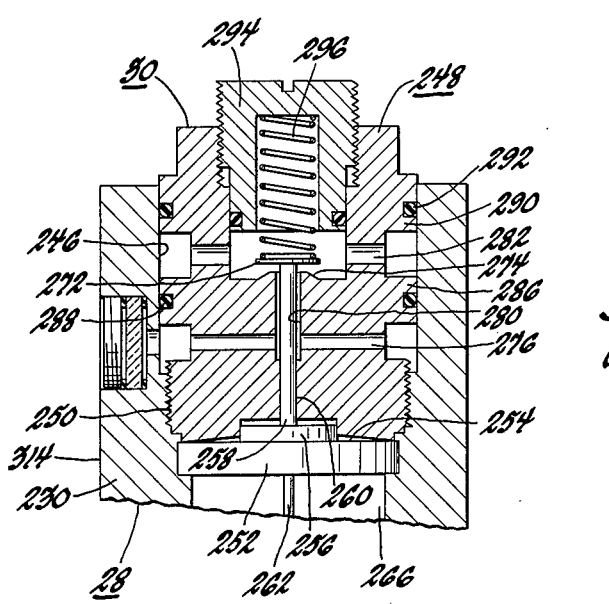
FIGURE 8 is a view in vertical section taken along the line 8–8 of FIGURE 6.

More specifically, as best seen in FIGURE 9, the drive end plate 152 has been modified to include a radially outwardly directed flange 156 thereon directed outwardly of a cylinder head 158 including a generally circular suction chamber 160 and a discharge chamber 162 arranged concentrically with the suction chamber 160 radially outwardly thereof. The head 158 also has an integral portion 164 thereon that serves as a means for supporting the coil of an electromagnetic clutch assembly of the type set forth in United States patent No. 3,082,933, to Bernard, issued March 26, 1963, and another integral portion 166 forming a tubular extension directed outwardly of the compressor for supporting a bearing assembly and a seal assembly of the type set forth in the Bernard patent.

In the illustrated arrangement, the magnetic clutch and pulley assembly 12 is thereby connected on the end of the modified housing 154 by suitable screw fastening means directed through a radially outwardly directed flange 168 on the modified housing 154 into threaded engagement with the flange 156. The improved end plate 152 is thereby held at the cylinder head 158 thereon against the outer face of a valve plate 170. An O-ring seal member 172 is located between valve plate 170 and an inclined outer surface 174 on the member 158 for preventing leakage from the discharge chamber 162 and annular O-ring seal members 176, 178 in member 158 are located in surrounding relationship with the suction chamber 160 to prevent leakage therefrom.

By virtue of the above-described modified end plate 152, the compressor 10 can be quickly taken apart for repair by disconnecting the member from the outer housing and removing the electromagnetic clutch assembly and modified end plate 152 to gain access to the interior operative parts of the compressor that are as set forth in the Ransom et al. patent.

Figure 5:
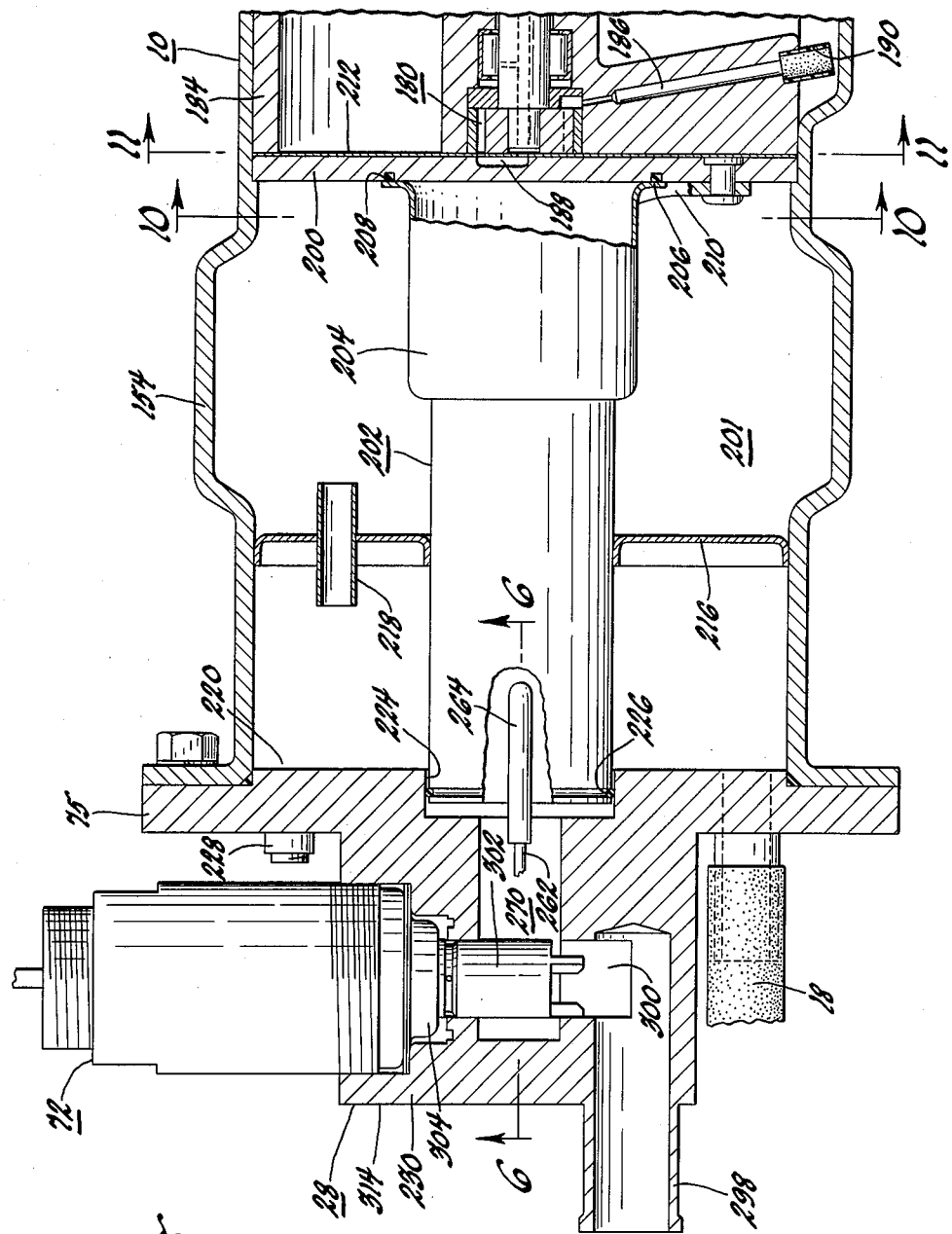
FIGURE 5 is a view in vertical section taken along the line 5–5 of FIGURE 2.

Certain other modifications have been made from the basic Ransom et al patent including relocating an oil pump assembly 180 interiorly of the cylinder block therein as best seen in FIGURE 5. This necessitates a modified block 184 and relocation of the bearing structure at this end of the compressor and provision for a modified oil inlet passageway 186 in the cylinder block 184 from the compressor sump to the pump assembly 180. A discharge passageway 188 in a valve plate 200 serves to direct oil from pump 180 to the relocated bearing.

A further modification is the provision of a flexible oil intake tube 190 that enables the interior operative parts of the compressor to be moved axially outwardly of the shell 154 through the drive end thereof. By making the intake tube 190 of a flexible material, it will yield sufficiently to permit removal of the internal parts connected thereto.

Figure 10:
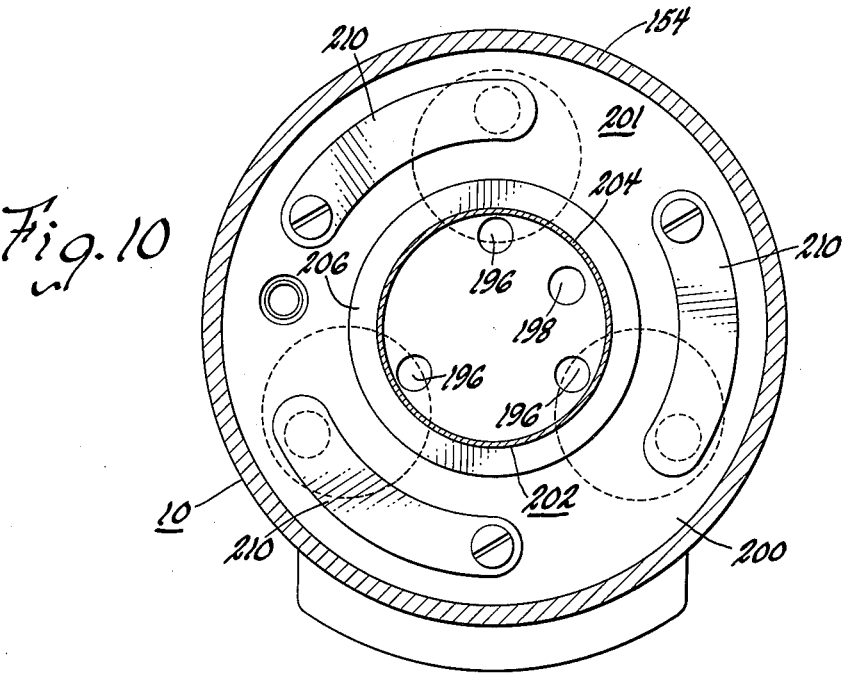
FIGURE 10 is a view in vertical section taken along the line 10–10 of FIGURE 5.
Figure 11:
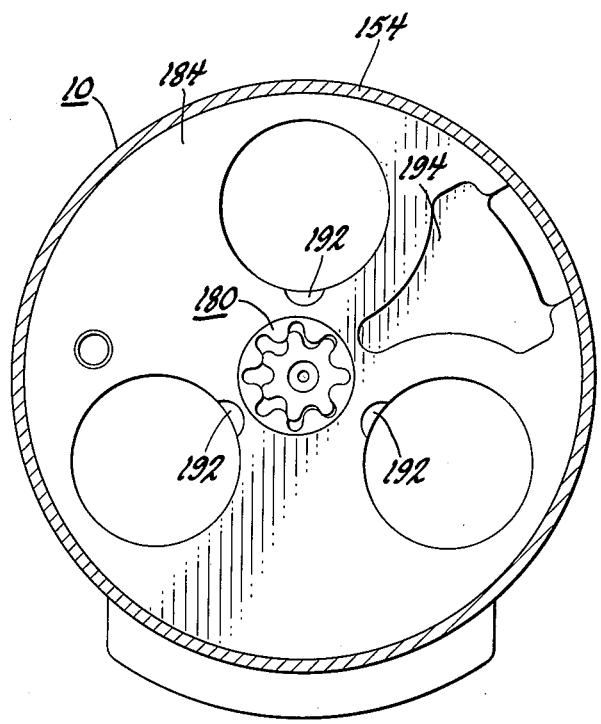
FIGURE 11 is a view in vertical section taken along the line 11–11 of FIGURE 5.

A further modification of the cylinder block at this end, as seen in FIGURES 10 and 11, includes a relocation of fingernail indentations 192 to the pumping cylinders and a modified passageway 194 to the suction crossover passageway in the compressor whereby modified inlet ports 196 and suction cross-over ports 198 in a modified valve plate member 200 are arranged within an area that is enclosed by an intake muffler structure 202 having a substantially circular portion 204 that encloses the openings 196, 198. In the illustrated arrangement, the circular portion 204 of the inlet muffler 202 has a radially outwardly directed flange 206 that is held in sealing engagement with an annular O-ring 208 supportingly received within a groove in the outer face of the modified valve plate member 200. The modified plate 200 has discharge control valve members 210 located circumferentially therearound on the outer face thereof, substantially like those in Ransom et al, which control flow into a discharge muffling chamber 201 formed by the casing 154 when it extends from the plate 200 around muffler 202. The opposite face of the valve plate 200 is in juxtaposition with a modified reed valve 212 having valving members thereon that control fluid flow from the inlet muffler 202 through the suction openings 196.

One feature of the modified outer casing 154 is that it, in conjunction with the suction muffler 202, serves, where desirable, as a support for a baffle member 216 directed transversely across the annular discharge muffling chamber 201. The baffle 216 has a tuning tube 218 directed therethrough for producing a desired discharge muffling effect.

By virtue of the above-described modified outer shell 154 and suction and discharge muffling chambers, a structure is provided that eliminates the need for the complex rear head arrangement disclosed in Ransom et al. Moreover, by internally locating the mufflers, as illustrated, external lines and associated connecting fittings between the mufflers and the compressor are eliminated. In the illustrated arrangement an open end 220 of the modified outer casing 154 is closed by the flanged face 75 on the improved fluid control package 28. In this arrangement, the head 75 includes an opening 224 therein in which the inlet end of the muffler 202 is supportingly received. An annular O-ring seal member 226 is located between the inlet end of the muffler 202 and the face 75 to prevent fluid leakage between the high and low sides of the compressor. It will be understood that the inlet end of the muffler 202 could suitably be received by a separate closure plate having inlet and outlet openings therein that are adapted to be connected to external lines rather than to the improved fluid control package.

*The fluid control package*

The provison of the improved fluid control package 28 reduces the number of external lines in the improved refrigerant system along with their associated fluid couplings and connecting fittings whereby the automotive system illustrated in FIGURE 1 can be quickly installed as an original equipment system or easily removed from under the hood of an automobile for replacement or in-the-field servicing.

Moreover, the improved fluid control package 28 is readily removable as a unit from the improved automotive refrigeration system for checking the operativeness thereof without having to disconnect a substantial number of external lines.

More specifically, the improved control package is characterized by a compact arrangement of the expansion valve 30, suction throttle valve assembly 72, receiver dehydrator 26 and a relief valve 228 serving to control pressure in the discharge muffling chamber 201. These components are all supportingly received within a common housing 230 that lends itself to a continuous in-line manufacturing process using conventional drilling tools and machines.

Figures 6, 7:
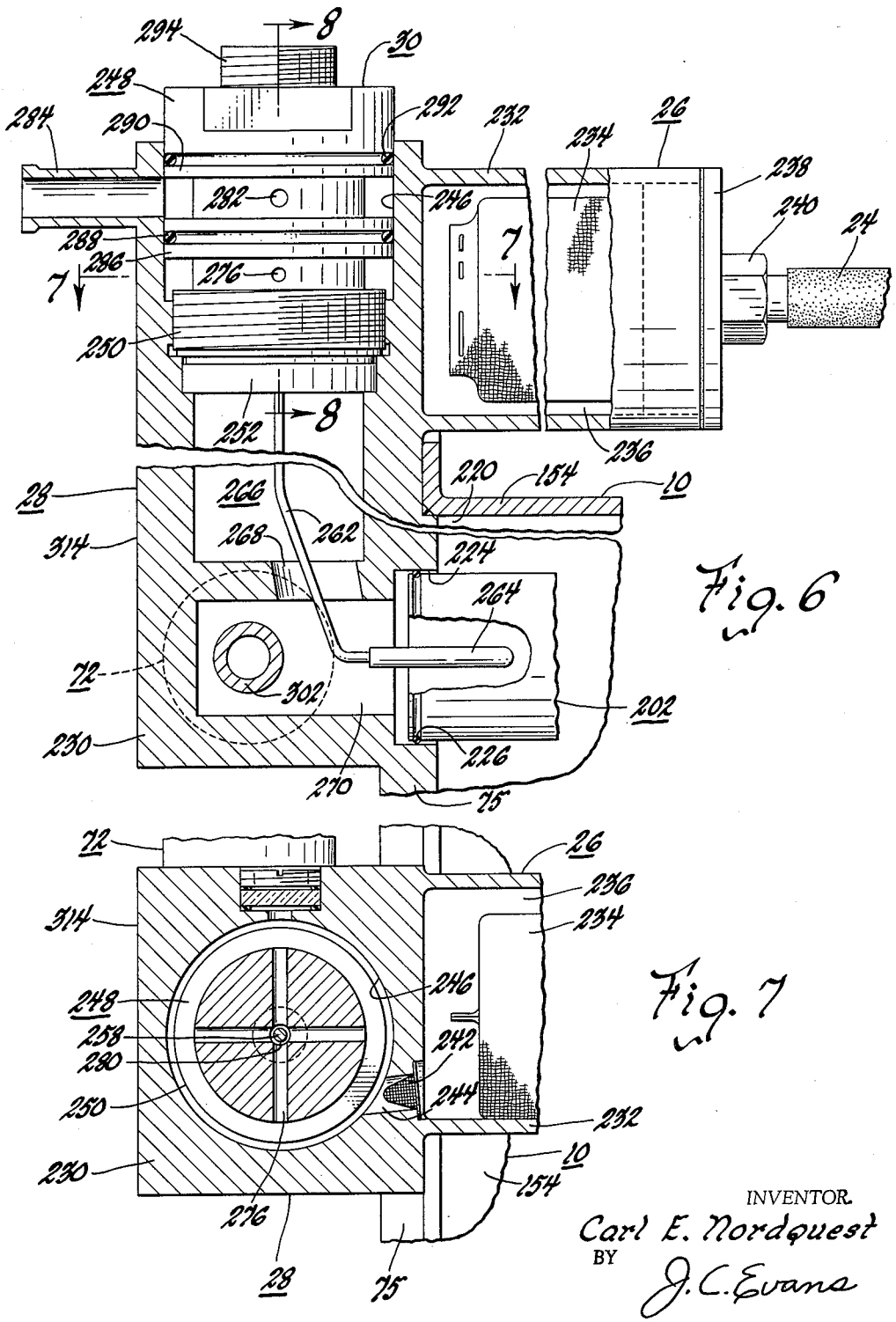
FIGURE 6 is a view in horizontal section taken along the line 6–6 of FIGURE 5.
FIGURE 7 is a view in vertical section taken along the line 7–7 of FIGURE 6.

The common housing 230 includes an elongated, tubular extension 232 directed outwardly thereof, as best illustrated in FIGURES 6 and 7, having an open end through which a suitable disposable bag 234 of silica gel or other suitable drying agent is inserted into the interior 236 of the assembly 26. In the illustrated arrangement, the open end of the tubular extension 232 is closed by an end plate 238 having an inlet fitting 240 thereon connected to the return line 24 from the condenser 20. The condensed liquid from the condenser is treated by the silica gel as it passes through the receiver dehydrator 26 and then the liquid passes through a screen 242 in an inlet opening 244 formed by housing 230 into a large diameter opening 246 in the housing 230 that supportingly receives a cylinder and O-ring assembly 248 of the expansion valve 30. The cylinder and O-ring assembly 248 of the expansion valve in the illustrated arrangement includes an externally threaded end portion 250 that threadably engages the interior of the housing 230 for fastening the expansion valve in place in the fluid control package. The improved valve 30 further includes a power element 252 supported by the block 230 so that a movable diaphragm portion 254 thereon is located in juxtaposition with a diaphragm disc 256 that engages the end of an elongated spool 258 directed through an opening 260 in the end 250 of the O-ring and cylinder assembly 248. The hollow interior of the power element 252 communicates through a capillary tube 262 with a thermostatic bulb 264 that is located within the inlet end of the inlet muffler 202 for sensing the temperature of the refrigerant vapor being returned to the compressor. The capillary tube 262, more specifically, passes through a pressure equalizer opening 266 formed within the housing 230 coaxially of the opening 246 therein and is directed through a connecting passage 268 that communicates the opening 266 with an opening 270 that is directed transversely of the opening 266 in the housing 230 to communicate with the open inlet end of the muffler 202.

By virtue of this arrangement, the temperature of the air that passes over the evaporator 24 will determine the amount of refrigerant that will enter and pass through the evaporator through the expansion valve 30. For example, when the air is very warm, the heat transfer from the air to the refrigerant is greater and the temperature sensed by the bulb 264 will produce an expansion of a suitable thermally expansible fluid therein to force the diaphragm 254 against the disc 256 so as to move the spool 258 inwardly of the cylinder and O-ring package 248 to move a valve control disc 272 off a seat 274 whereby an increased amount of refrigerant will flow from the receiver dehydrator 26 through the opening 244 therefrom into the opening 246 in the block 230 and thence through inlet opening 276 in the assembly 248, around the spool 258 at a clearance 280 that is coaxially aligned with the opening 260. Thence, the refrigerant passes across the valving element 272 and through outlet openings 282 from the cylinder and O-ring assembly, through an outlet fitting 284 on the housing 230. The assembly 248 also includes a first O-ring supporting shoulder 286 that supportingly receives an annular O-ring seal member 288 for sealingly separating the inlet opening 276 from the outlet opening 282. A second seal supporting shoulder 290 supportingly receives an annular O-ring seal member 292 for preventing leakage exteriorly of the housing 230.

In addition to the control afforded by the temperature sensed by the bulb 264, pressure in the equalizer opening 266 acts on the diaphragm 254 oppositely to the thermostatic bulb pressure whereby the outlet pressure from the suction throttling valve 72 is imposed on the expansion valve to override the controlling action of the thermostatic bulb. This is a common provision in expansion valves and is used to prevent the suction pressure of the compressor from dropping below a predetermined point when the compressor capacity becomes greater than the evaporator load. The improved valve 30 also includes a mechanical adjusting nut 294 for varying the biasing action of a valve controlling spring 296 that returns the valving disc 272 against the controlling action of the thermostatic bulb pressure and equalizer opening pressure.

The refrigerant gas returned from the evaporator passes through an inlet fitting 298 on housing 230, best shown in FIGURE 5 that communicates with a small diameter opening 300 and the transverse opening 270. The small diameter opening 300 slidably receives a movable piston 302 of the throttling valve assembly 72 which includes a conventional diaphragm element 304 for moving the piston 302 axially of the opening 300 in response to engine vacuum or the like for automatically maintaing the evaporator pressure at a desired point and preventing evaporator core freezeup in a conventional manner.

It should be noted that the openings for receiving the expansion valve 30 and throttling valve assembly 72 are formed as a plurality of colinear, varying diameter openings that can be quickly formed by conventional machining practices on a continuous in-line process without having to manipulate the block with respect to the line. By way of example, in the illustrated embodiment of the invention the block 230 has a substantially plane face 314, as shown in FIGURE 6, which can be supportingly received by a suitable work platform and the block can then be moved with respect to suitable drilling equipment to form the colinear openings for the expansion valve and the colinearly arranged openings for the throttling valve. The fittings 298, 284 and the interconnecting passageway 268, of course, may be formed by conventional casting methods.

By virtue of the above-described improved fluid control package, the various controlling components, as well as a received dehydrator, are compartly arranged and intercommunicated so as to eliminate many external conduits from the improved refrigerant system. Moreover, the unit is adaptable for association with a production axial piston, swash plate actuated compressor merely by changing the outer shell configuration at one end thereof.

A further feature of the arrangement is that the housing 230, in addition to serving as an intercommunication between compressor receiver dehydrator and the valve components, also serves as the housing for these components whereby the cost of the control components in the refrigerant system is substantially reduced over those arrangements presently in use.

Yet another feature of the system is that the common housing 230 serves as the head of the integral suction and discharge mufflers of the improved compressor to further improve the economy of the refrigerant system.

Yet another feature is that the common housing forms the outer shell of a dehydrator unit that includes a disposable silica gel bag or the like that can be replaced at an extremely reasonable price since only the bag must be replaced rather than a complete cartridge as is presently found in present production automobile air conditioning systems.

In view of the aforesaid remarks, it will be appreciated by those skilled in the art that the operating efficiency of automobile air conditioning systems, by virtue of the present invention, is substantially improved. Moreover, the invention substantially improves both the original placement and subsequent replacement of the system as well as the control components therein without sacrificing operating efficiency.

Additionally, it will be appreciated that the improved control package is especially suited for manufacture under unusually economical process conditions and in the case of the evaporator valve component of the control valve package, it will be appreciated that suitable control of refrigerant flow to the evaporator is effected by a valving assembly having a minimum of operative parts.

While the embodiments of the present invention as herein disclosed constitute preferred forms, it is to be understood that other forms might be adopted.

What is claimed is as follows:

1. An automobile air conditioning system for association with the passenger compartment of a motor vehicle having an engine compartment separated from the passenger compartment by a fire wall including inlet and outlet openings therein comprising the combination of, an evaporator enclosure including an intake opening and an evaporator compartment separated therefrom having an outlet opening, motor driven means including a fan for drawing air from said intake passageway and directing it through said evaporator compartment outlet opening, flexible coupling means for connecting the enclosure intake opening to the fire wall outlet opening and the evaporator compartment outlet opening to the fire wall inlet opening to reduce transmission of vibrations from the evaporator enclosure to said fire wall, a compressor having an elongated low profile outer casing with a drive shaft directed outwardly of one end thereof, means for drivingly connecting said drive shaft to the automobile engine for operating the compressor, means forming an inlet and an outlet opening from said compressor, a condenser, an evaporator located within said evaporator compartment, an integrated refrigerant fluid flow control package including a receiver dehydrator assembly, an evaporator valve assembly and a suction throttling valve assembly, said integrated fluid flow control package including housing means common to said receiver dehydrator, expansion valve and throttling valve assemblies, said housing means further including a face portion fixedly secured to the end of said compressor opposite to its driven end, said housing means being supported on and located in juxtaposition relationship with said evaporator enclosure means whereby said enclosure means, fluid control package and compressor are unitized for installation and servicing, and means including passageways in said housing means for fluidly connecting said compressor, said condenser, and said evaporator in serial refrigerant flow relationship.

2. In the combination of claim 1, said means for drivingly connecting said compressor to the automobile engine comprising a speed changer assembly including a rotatable shaft, a plurality of flanged members secured to said shaft for rotation therewith and for movement axially therealong, means including a first belt for drivingly connecting first and second of said flanged members to the automobile engine and means including a second belt for drivingly connecting said second and a third of said flanged members to said compressor drive shaft, and speed responsive means on one of said first and third flanged members for shifting said second flanged member toward one of the first and third members and away from the other of the first and third members to change the speed ratio between the engine drive and the driven compressor to effect a continuously varying change of compressor speed between predetermined limits that on the low side exceeds the engine idle speed and on the high side is less than the maximum engine r.p.m.

3. In the combination of claim 2, means for floatingly supporting said rotatable shaft to compensate for slack in said first and second belts produced by the axial movements of said flanged members on said rotatable shaft, and means for continuously biasing said flanged members in a predetermined direction along said shaft to maintain said first belt in the plane of the engine drive pulley.

4. In the combination of claim 1, said compressor housing including a valve plate located interiorly thereof, means forming inlet and outlet openings in said valve plate, said housing extending from one side of said valve plate to form a discharge muffling chamber, said face of said control package serving to close the open end of said discharge muffling chamber, an elongated open-ended tubular member located within said discharge member having one end sealingly engaged on the outer face of said valve plate and the opposite end thereof supportingly received within said control package face, means for sealing the interface between said opposite end and said face, and means forming a passageway in said common housing means to communicate said opposite end of said tubular member with said throttling valve assembly for directing refrigerant from said throttling valve assembly to said inlet opening in said valve plate.

5. An automobile air conditioning system for association with the passenger compartment of a motor vehicle having an engine compartment separated from the passenger compartment by a fire wall including inlet and outlet openings therein comprising the combination of, an insulated evaporator enclosure including an intake opening and an evaporator compartment separated therefrom having an outlet opening, motor driven means including a fan for drawing air from said intake passageway and directing it through said evaporator compartment outlet opening, flexible coupling means for connecting the enclosure intake opening to the fire wall outlet opening and the evaporator compartment outlet opening to the fire wall inlet opening to reduce transmission of vibrations from the insulated evaporator enclosure to said fire wall, a compressor having an elongated low profile outer casing with a drive shaft directed outwardly of one end thereof, means forming an inlet and an outlet opening from said compressor, a condenser, an evaporator located within said evaporator compartment, an integrated refrigerant fluid flow control package including a receiver dehydrator assembly, an evaporator valve assembly and a suction throttling valve assembly, said integrated fluid flow control package including housing means common to said receiver dehydrator, expansion valve and throttling valve assemblies, said housing means further including a face portion fixedly secured to the end of said compressor opposite its driven end, said housing means being supported on and located in juxtaposition relationship with said insulated evaporator enclosure means whereby said enclosure means, fluid control package and compressor are unitized for installation and servicing, and means including passageways in said housing means for fluidly connecting said compressor, said condenser, said fluid control package and said evaporator in serial refrigerant flow relationship, said housing means including a pressure equalizer opening for directing pressure in the inlet of said compressor to said evaporator valve assembly for modulating the controlling action thereof, and means for drivingly connecting said compressor drive shaft to the automobile engine for operating said compressor to direct compressed gas to said condenser and draw refrigerant gas from said evaporator to reduce the temperature of said evaporator to a predetermined point under the control of said expansion and suction throttling valve assemblies in said common housing means.

6. In the combination of claim 5, said means for drivingly connecting said compressor to the automobile engine comprising a speed changer assembly including a rotatable shaft, a plurality of flanged members secured to said shaft for rotation therewith and for movement axially therealong, means including a first belt for drivingly connecting first and second of said flanged members to the automobile engine and means including a second belt for drivingly connecting said second and a third of said flanged members to said compressor drive shaft, and speed responsive means on one of said first and third flanged members for shifting said second flanged member toward one of the first and third members and away from the other of the first and third members to change the speed ratio between the engine drive and the driven compressor to effect a continuously varying change of compressor speed between predetermined limits that on the low side exceeds the engine idle speed and on the high side is less than the maximum engine r.p.m.

7. An automobile air conditioning system for association with the passenger compartment of a motor vehicle having an engine compartment separated from the passenger compartment by a fire wall including inlet and outlet openings therein comprising the combination of, an insulated evaporator enclosure including an intake and an evaporator compartment separated therefrom having an outlet opening, motor driven means including a fan for drawing air from said intake passageway and directing it through said evaporator compartment outlet opening, flexible coupling means for connecting the enclosure intake opening to the fire wall outlet opening and the evaporator compartment outlet opening to said fire wall inlet opening to reduce transmission of vibrations from the insulated evaporator enclosure to said fire wall, a compressor having an elongated low profile outer casing with a drive shaft directed outwardly of one end thereof, means for drivingly connecting said drive shaft to the automobile engine for operating the compressor, means forming an inlet and an outlet opening from said compressor, a condenser, an evaporator located within said evaporator compartment, a fluid control unit including an outer housing, means forming a first passageway through said housing including an inlet communicating with the outlet of the condenser and an outlet communicating with the inlet of the evaporator, means forming a second passageway through said housing including an inlet communicating with the evaporator outlet and an outlet communicating with the inlet of the compressor, an expansion valve assembly supported within said housing having an internal passageway therethrough, valving means within said internal opening for controlling fluid flow through said first passageway, means forming an equalizer passageway within said housing communicating said first passageway with said second passageway, said expansion valve including a temperature sensor directed through said equalizer passageway into said second passageway, means responsive to temperature sensed by said sensor for varying the operative position of said valve means for controlling refrigerant flow through said first passageway, a throttling valve assembly supported by said housing including a movable piston located within said second passageway for controlling fluid flow therethrough, said equalizer passage fluid pressure acting on said valving means to modulate the controlling action thereof.

8. In the combination of claim 7, said outer housing including an elongated tubular portion forming a part of said first passageway having an interior space therein for accumulating liquid refrigerant and a drying agent therein for removing moisture from the liquid refrigerant therein, said drying agent means being removably located within said tubular extension for replacement.

9. In the combination of claim 7, said outer housing including a face portion fixedly secured to said compressor opposite to its driven end, said housing being supported on and located in juxtaposition with said evaporator enclosure means whereby said evaporator enclosure, fluid control unit and compressor are unitized for installation and servicing.

10. In the combination of claim 9, said means for drivingly connecting said compressor to the automobile engine comprising a speed changer assembly having a rotatable shaft, a plurality of flanged members secured to said shaft for rotation therewith and for movement axially therealong, means including a first belt for drivingly connecting first and second of said flanged members to the automobile engine and means including a second belt for drivingly connecting said second and a third of said flanged members to said compressor drive shaft, and speed responsive means on one of said first and third flanged members for shifting said second flanged member toward one of the first and third members and away from the other of the first and third members to change the speed ratio between the engine drive and the driven compressor to effect a continuously varying change of compressor speed between predetermined limits that on the low side exceeds the engine idle speed and on the high side is less than the maximum engine r.p.m.

11. In the combination of claim 10, means for floatingly supporting said rotatable shaft to compensate for slack in said first and second belts produced by the axial movements of said flanged members on said rotatable shaft, and means for continuously biasing said flanged members in a predetermined direction along said shaft to maintain said first belt in the plane of the engine drive pulley.

12. A compact fluid control assembly for association with an automobile air conditioning system comprising, a support block having a substantially flat face, means forming a first plurality of colinearly arranged variable diameter openings in said block having an axis directed substantially parallel to said flat face, means forming a second plurality of colinearly arranged variable diameter openings having their axis substantially parallel to said flat face and perpendicularly arranged with respect to said first plurality of openings, equalizer passageway means in said block intercommunicating said first plurality of openings with said second plurality of openings, a fluid fitting directed outwardly of said flat face communicating one of the openings in said first plurality of openings exteriorly of said support block, a second fluid fitting on said face communicating one of the openings of said second plurality of openings exteriorly of said support block, an elongated tubular projection extending from said support block, drying agent means removably received within said projection for quick replacement, means forming an inlet passageway in said block, communicating the interior of said tubular projection with one of said first plurality of openings, means forming an outlet passageway from said block communicating with said second plurality of openings, an expansion valve assembly located interiorly of said first plurality of openings having the outer perphery thereof supportingly received by said support block, said expansion valve including a temperature responsive sensing element located within said outlet passageway for sensing the temperature therein for varying refrigerant flow between said inlet passageway and said first of said fittings on said flat face, a throttling valve assembly located interiorly of said second plurality of openings including outer peripheral portions received by said support block and a movable piston for controlling fluid flow between the other of said fluid fittings and said outlet passageway, said equalizer passage serving to communicate said outlet passageway and said expansion valve assembly, said expansion valve assembly including means responsive to pressure in said equalizer passageway for modulating the temperature responsive controlling action thereof.

13. A compact fluid control assembly including a support block having a substantially flat face, means forming a plurality of colinearly arranged variable diameter openings in said block having an axis directed substantially parallel to said flat face, means in said block forming an inlet passageway to one of said first plurality of openings, means forming a second plurality of colinearly arranged variable diameter openings having their axis substantially parallel to said flat face and perpendicularly arranged with respect to said first plurality of openings, means intercommunicating said first plurality of openings with said second plurality of openings, a fluid fitting directed outwardly of said flat face communicating one of the openings in said first plurality of openings exteriorly of said support block, a second fluid fitting on said face communicating one of the openings of said second plurality of openings exteriorly of said support block, pressure equalizer means forming a passageway in said block, means forming an outlet passageway from said block communicating with said pressure equalizer passageway and said second plurality of openings, an expansion valve assembly located interiorly of said first plurality of openings having the outer periphery thereof supportingly received by said support block, said expansion valve including a temperature responsive sensing element located within said outlet passageway for sensing the temperature therein, said expansion valve assembly including valve means responsive to the sensed temperature for varying refrigerant flow between said inlet passageway and said first of said fittings on said flat face, a throttling valve assembly located interiorly of said second plurality of openings including outer peripheral portions received by said support block and a movable piston for controlling fluid flow between the other of said fluid fittings and said outlet passageway, said equalizer passageway serving to direct the pressure in said outlet passageway against said expansion valve assembly for modulating the temperature responsive controlling action thereof.

14. An improved fluid control unit for association with an automobile air conditioning system including an outer housing, means forming a first passageway through said housing including an inlet adapted to be connected to the outlet of a condenser and an outlet adapted to be connected to the inlet of an evaporator, means forming a second passageway through said housing including an inlet adapted to be connected to the evaporator outlet and an outlet adapted to be connected to the inlet of a compressor, an expansion valve assembly supported within said housing having an internal passageway therethrough, valving means within said internal passageway for controlling fluid flow through said first passageway, means forming an equalizer passageway within said housing communicating said first passageway with said second passageway, said expansion valve including a temperature sensor directed through said equalizer passageway into said second passageway, means responsive to temperature sensed by said sensor for varying the operative position of said valve means for controlling refrigerant flow through said first passageway, a throttling valve assembly supported by said housing including a movable piston located within said second passageway for controlling fluid flow therethrough, said equalizer passage fluid pressure acting on said valving means to modulate the controlling action thereof.

15. In the combination of claim 14, said housing including an elongated tubular portion forming a part of said first passageway having an interior space therein for accumulating liquid refrigerant and a drying agent means therein for removing moisture from the liquid refrigerant therein, said drying agent means being removably located within said tubular extension for replacement.

16. An improved speed changer assembly for association with a drive and a driven pulley comprising, an arm having a bifurcated end portion, a shaft rotatably supported by the bifurcated end of said support arm, a plurality of flanged members supported by said shaft for rotation therewith and for axial movement relative thereto, speed responsive means on one of said flanged members including a link operatively engaging another of said flanged members, said speed responsive means being operative to move said link to force said other of said flanged members away from said one flanged member and toward a third flanged member for increasing the effective diameter of a belt pulley formed by said another and said third flanged members and decreasing and effective diameter of a second belt pulley formed by said one flanged member and said another flanged member whereby the speed ratio between a driven and a drive pulley connected to said first and second belt pulleys by belts is continuously varied between predetermined desired limits.

17. In a pulley system the combination of, a drive pulley, a driven pulley, a support arm having a bifurcated end portion, a rotatable shaft supported by said bifurcated end, a plurality of flanged members supported by said shaft for rotation therewith and for axial sliding movement thereon, speed responsive means on one of said flanged members including a link member, said link member operatively engaging another of said flanged members for shifting it away from said one flanged member toward a third flanged member, belt means passing over a first pulley formed by said one and another flanged members and a second pulley formed by said another and said third flanged members including belt portions directed around said drive and driven pulleys, the axial movement of said another flanged member decreasing the effective diameter of said first pulley and increasing the effective diameter of said second pulley for varying the speed of said driven pulley between predetermined limits exceeding a predetermined idle drive speed and less than the maximum r.p.m. of said drive pulley.

18. In the combination of claim 17, said speed responsive means including, a plurality of circumferentially located lugs having one end thereof pivotally supported by said one flanged member, each of said lugs having an ear portion offset from said pivotal connection, said link having one end thereof pivotally connected to said lug and the opposite end thereof pivotally connected to said another flanged member whereby an increase of shaft speed moves said lug radially outwardly of the axis of said shaft to pivot said ear and move said link in an axial direction for effecting the axial movement of said another flanged member with respect to said one and said third flanged members.

19. In a pulley system the combination of, a drive pulley, a driven pulley, a support arm having a bifurcated end portion, a rotatable shaft supported by said bifurcated end, a plurality of flanged members supported by said shaft for rotation therewith and for axial sliding movement thereon, speed responsive means on one of said flanged members including a link member, said link member operatively engaging another of said flanged members for shifting it away from said one flanged member toward a third flanged member, belt means passing over a first pulley formed by said one and another flanged members and a second pulley formed by said another and said third flanged members including belt portions directed around said drive and driven pulleys, the axial movement of said another flanged member decreasing the effective diameter of said first pulley and increasing the effective diameter of said second pulley for varying the speed of said driven pulley between predetermined limits exceeding a predetermined idle drive speed and less than the maximum r.p.m. of said drive pulley, said support arm having a slidably supported end portion for floatingly supporting said plurality of flanged members to take up belt slack between said first and second pulleys and said drive and driven pulleys.

References Cited by the Examiner
UNITED STATES PATENTS

| | | | |
|---|---|---|---|
| 2,151,987 | 3/1939 | Perrine | 74—230.17 |
| 2,720,087 | 10/1955 | Groene | 62—230 |
| 2,824,427 | 2/1958 | Baker | 62—244 |
| 2,910,840 | 11/1959 | Miller | 62—230 |

WILLIAM J. WYE, *Primary Examiner.*